Feb. 15, 1966  G. DE COYE DE CASTELET  3,234,857
ELECTROHYDRAULIC UNITS FOR CONTROLLING HYDRAULIC TRANSDUCERS
Filed Feb. 8, 1965  3 Sheets-Sheet 1

Inventor
Gaetan de Coye de Castelet
By Stevens, Davis, Miller & Mosher
Attorneys Inventor
Gaetan de Coye de Castelet
By Stevens, Davis, Miller & Mosher
Attorneys

| AR | N | 1 | 2 | 3 |
|---|---|---|---|---|
| $E_2$ | $F_1$ | $E_1$ | $E_1$ | $E_1$ |
| $F_1$ | | $F_1$ | $F_2$ | $E_2$ |
| $S_2$ | $S_1$ | $S_1$ | $S_1$ | |
| $S_3$ | $S_2$ | $S_3$ | | |
| | $S_3$ | | | |

Inventor
Gaetan de Coye de Castelet
By Stevens, Davis, Miller & Mosher
Attorneys

United States Patent Office 3,234,857
Patented Feb. 15, 1966

3,234,857
ELECTROHYDRAULIC UNITS FOR CONTROLLING HYDRAULIC TRANSDUCERS
Gaëtan de Coye de Castelet, Billancourt, France, assignor to Regie Nationale des Usines Renault, Billancourt, France
Filed Feb. 8, 1965, Ser. No. 431,020
Claims priority, application France, Feb. 14, 1964, 963,887, Patent 1,394,128
3 Claims. (Cl. 91—414)

This invention relates to an electrohydraulic unit for controlling hydraulic transducers, the latter term including in particular all actuating rams or cylinders forming part of hydraulic servo systems.

It is already known to utilize electrohydraulic control units employing electrovalves in which it is usual for a solenoid to actuate over its entire travel a slide-valve against a countering return spring. In such cases the slide valve must be precisely guided and the spring relatively powerful, resulting in relatively high cost for the electrovalve and relatively high electric power consumption. This is likewise the case when the spring is dispensed with and replaced by two alternately operable solenoids.

The present invention has for its principal object to provide an improved electrohydraulic unit which overcomes the drawbacks referred to and which, though applicable to stationary plant or machinery, is all the more advantageous for application on vehicles in that it markedly attenuates said drawbacks.

The subject electrohydraulic unit of this invention for controlling hydraulic transducers, comprising, a two-position slide-valve connectable to a pressure-fluid source, in which one of said positions causes said source to be connected to at least one transducer and the other causes the latter to be discharged, a solenoid being provided to control the slide-valve position, is essentially characterized in that said solenoid controls a slide-valve governing valve and in that said slide-valve comprises, for the governing thereof, a casing with two chambers for controlling said slide-valve that are permanently connected to said source and so devised that said pressure-fluid exert opposing forces therein on said slide-valve, the latter having a larger effective control surface area in one of said chambers, which chamber is supplied through a constricted passage and connected through a passage controlled by said slide-valve to a discharge pipe which is closed or opened by said valve and on the closure or opening of which the two said slide-valve positions are dependent.

For when said valve is open, one of the slide-valve positions is that wherein said controlled passage is partly uncovered by the slide-valve as the result of a balancing of the opposing forces exerted thereon at different pressures. When, on the contrary, said valve is closed, the slide-valve is located in its other position as a result of the preponderant influence of the controlling pressure in the chamber in which the effective slide-valve area is greater.

In this particular system, the governing valve actuated by the solenoid need have only a short travel of a few tenths of a millimeter, while the solenoid will have only very low power consumption because its characteristics are perectly suited to the valve-closing function assigned to it; for when the air gap is at a maximum, the resistance offered to the valve when the same is open by the fluid flow is very small, then increases with closure of the valve at the same time as the air gap diminishes, up to a maximum value corresponding to a virtually zero air gap, whereby the force furnished by the solenoid follows precisely the law of the resistance to be overcome for valve closure. In addition to low electric power consumption, the system accordingly has very rapid response characteristics due chiefly to the short valve travel, and also affords the possibility of connecting the solenoid into a transistorized circuit.

A system according to the invention lends itself in addition to the design of compact electrohydraulic units with shorter connections and reduced pressure losses.

Such units may be immersed in the oil supply of the hydraulic system in question, thereby affording the notable advantage of automatic compensation for the thermal effects. Since the solenoid must furnish a larger force when cold than when hot; such compensation stems from the fact that the electrical resistance of the winding will consequently vary with the temperature of the surrounding oil in the correcting sense, and this can be achieved with an ordinary type winding when the type of oil customary for such applications is used.

Furthermore, such a system may be designed to fulfill its distribution functions in such manner that the hydraulic transducer be supplied or not with pressure fluid in one of the two positions of the governing valve. More specifically, in the application discussed hereinafter of electrohydraulic units according to the invention for controlling gear changes in an automobile gearbox, the option referred to permits of ensuring that, in the neutral position of the transmission, the transducers be all placed in the corresponding condition through the agency of the various electrohydraulic units (which would then have their governing valves closed) whereby, in this neutral position of the transmission, in which the engine of the vehicle is usually idling, there will nevertheless be available, due to the closure of the governing valves, a transducer controlling pressure capable of being established merely by the usual oil pump. This is not generally so in the case of known mechanisms, which must resort to an auxiliary or larger pump, which is a disadvantage at high engine speeds.

The substantial reduction in the capacity of the single pump, which is one of the advantages provided by the invention, is due to the fact that the liquid escapes through a passage controlled by the slide-valve, which slide-valve is in turn hydraulically servo-controlled in a stable position of equilibrium, thereby ensuring maximum reduction in the leakage flow and consequently in the required pump capacity.

A number of possible forms of embodiment of electrohydraulic units according to the invention will now be more particularly described with reference to the accompanying non-limitative exemplary drawing, in which, FIGURE 1 is a schematic view of an electrohydraulic unit according to the invention, showing the pressure source and an inoperative transducer which is operable by said unit;

Figure 1:
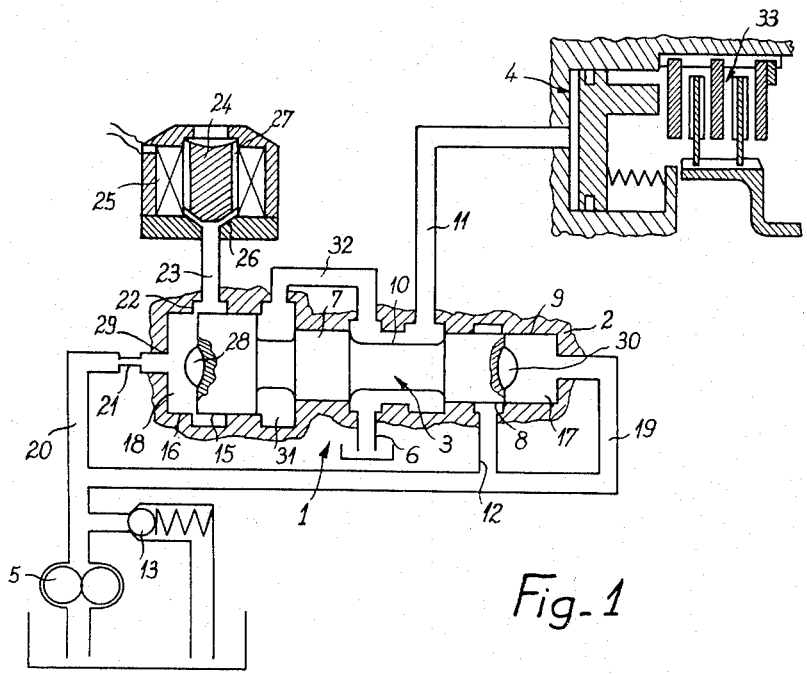
Figure 2:
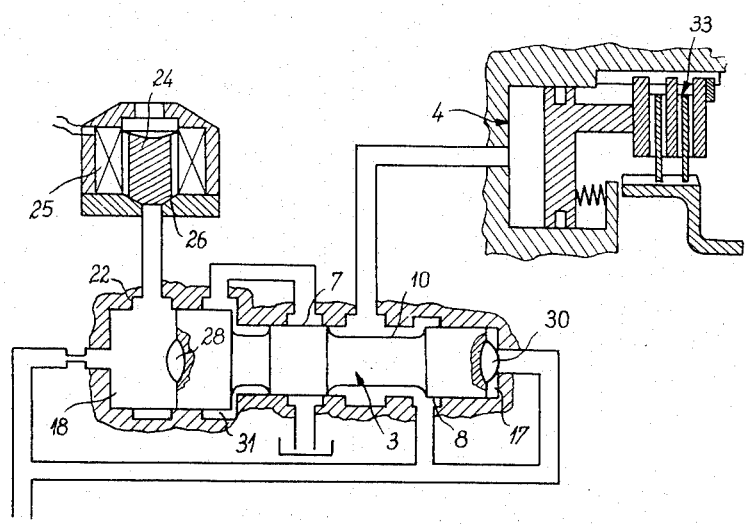
FIGURE 2 is a corresponding view to FIGURE 1, showing the functional mode of the electrohydraulic unit for rendering said transducer operative.

Referring first to FIGURES 1 and 2, the electrohydraulic unit shown thereon comprises a slide-valve generally designated by reference numeral 1 and of which the main casting denoted by numeral 2 contains a cylindrical slide 3, these two parts being jointly adapted to place a hydraulic transducer 4 in communication either with a pressure source shown in the drawing as being a gear-type pump 5, or with a discharge pipe 6, depending on the position of said slide.

The slide 3 accordingly embodies two cylindrical bearing surfaces of identical diameter 7 and 8 sliding through a bore 9 in the casting 2 and separated by a groove 10 which is adapted to place a conduit 11 connected to transducer 4 in communication either with the discharge conduit 6, or with a conduit 12 supplied responsively to the pump delivery pressure, which is in this case limited by a relief valve 13. These conduits are connected to annular grooves in the distributor casting, which are visible in the drawing but devoid of reference numerals in the interests of simplification.

The slide 3 further embodies at one of its extremities a third cylindrical bearing surface 15 of larger diameter than the other two bearing surfaces referred to and which is slidable in a corresponding bore 16 in the casting 2.

At each end of the slide, the slide-valve casting 2 forms two slide-controlling chambers, of which one (chamber 17) is formed at the end of bore 9 and the other (chamber 18) at the end of bore 16. These chambers are permanently connected to the pump 5 through conduits 19 and 20.

Along the supply path to the chamber 18 is formed a constricted passageway 21, and chamber 18 is surrounded by a groove 22 which places it in communication, under the control of the slide bearing surface 15, with a discharge conduit 23 the opening and closure of which is controlled by a valve 24. This valve 24 governs the slide 3 and is operable by a solenoid 25. As is clearly shown, the complete assembly may consist of an electromagnet whose frame forms the seat 26 for valve 24, the latter being constituted by the core of said electromagnet, which core has formed therein axial passages 27 permitting flow therethrough of the fluid issuing from the discharge conduit 23.

The permanent connection between the chamber 18 and the pump is in this case ensured by a protrusion on the slide at the end of its bearing surface 15, that is formed with an indent 28 adapted to leave free the passageway between chamber 18 and its supply port 29 in case the slide 3 should butt against said port. Similarly, at the end of its bearing 8, the slide has formed thereon an indented abutment protrusion 30.

The chamber 31 formed in the bore 16 on that side of bearing 15 which is remote from chamber 18 is normally in the discharging condition through a conduit 32 connecting it to the slide valve annular groove to which is additionally connected the discharge conduit 6.

The hydraulic transducer 4 is in this case assumed to be part of a multiple-disk brake 33 of the type commonly utilized in epicyclic gearboxes.

An electrohydraulic control unit as hereinbefore described functions in the following manner.

When the valve 24 is left free, i.e. open, the slide 3 is urged into the position arbitrarily shown in FIGURE 1, and stability in this position is ensured by the balancing opposed forces exerted on the slide in the following manner.

The pressure prevailing in chamber 17 is the delivery pressure of pump 5, while on the side of chamber 18 the groove 22 is uncovered by the slide bearing 15 to an extent wherefor the leakage flow through this groove aperture has a pressure which, due to the pressure loss engendered by the constricted passageway 21, is reduced in chamber 18 to a fraction of the pressure prevailing in chamber 17, and this fraction is equivalent to the ratio of the effective areas of the slide bearings 8 and 15 when the slide is in its position of equilibrium. In this particular slide position, any tendency for the slide to close the groove 22 is countered by an increased pressure in chamber 18, just as any tendency to enlarge the passageway between chamber 18 and groove 22 causes reduced pressure in chamber 18 and is countered by the preponderant influence of the pressure prevailing in chamber 17.

In the case of FIGURE 1, the slide 3 would then place the hydraulic transducer 4 in communication with the discharge conduit 6 via its groove 10 (the brake 33 being released). Conversely, when the valve 24 is closed through energization of the solenoid 25, the pressure would then be equalized between chambers 17 and 18 and the slide 3 moved to the position shown in FIGURE 2 due to the differential effect of the pressures exerted on the two ends of the slides, the protrusion 30 being then caused to butt against the end of chamber 17.

As a result of this slide displacement the bearing 7 obturates the annular groove connected to the discharge conduit 6, while the bearing 8 uncovers the annular groove to which the conduit 12 is connected. This in turn results in the slide groove 10 causing the pump 5 and the hydraulic transducer 4 to intercommunicate via said conduits and the conduit 11 (the brake 33 being applied responsively to the pump pressure limited by valve 13).

Disregarding the existence of conduit 32, it should be noted that the conduits 6 and 12 may be transposed should it be desired, contrarily to the foregoing, to cause the brake 33 to be applied in the open position of valve 24 and released in the closed position thereof.

Figure 3:
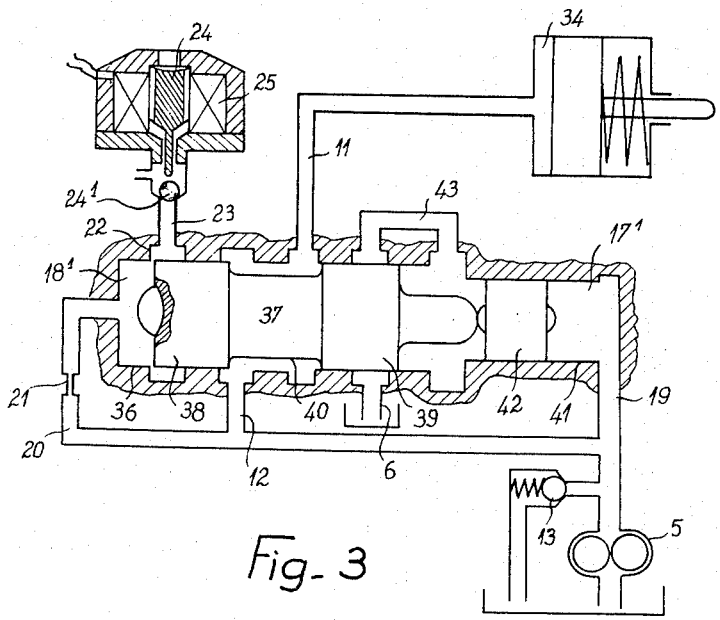
FIGURE 3 shows schematically an alternative form of embodiment of an electrohydraulic unit according to the invention.

Reference is accordingly had to FIGURE 3 for an alternative constructional form of the slide valve wherein, precisely, a hydraulic transducer 34 is rendered operative in the open position of the valve, which valve is in this case a ball-type valve $24^1$, like parts to those in the foregoing embodiment being designated by like reference numerals. In this case the modified slide valve comprises, formed in a casting 35, a bore 36 through which is movable a slide 37 having two cylindrical bearing surfaces 38 and 39 of equal diameter separated by a groove 40 adapted to place the conduit 11 connected to transducer 34 in communication either with the conduit 12 connected to the pump 5, or with the discharge conduit 6. Through another bore 41 is movable a piston 42 of diameter smaller than that of the slide 37. At the remote extremities of bores 41 and 36 are formed two slide-controlling chambers $17^1$ and $18^1$ respectively of which, as precedingly, the former is supplied through the conduit 19 and the latter through the conduit 20 and the constricted passageway 21. The chamber $18^1$ is surrounded by the groove 22 which places it in communication, under the control of the slide bearing 38, with the discharge conduit 23. The slide 37 and the piston 42 are thus urged into mutual contact, and the corresponding extremity of the bore 36 placed in permanent communication, through a groove and a conduit 43 with the groove to which the conduit 6 is linked.

Figure 4:
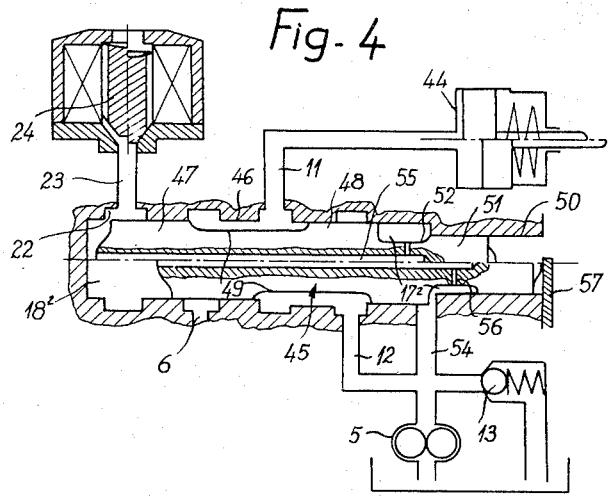
FIGURE 4 is a corresponding view of another alternative embodiment of an electrohydraulic unit according to the invention.

Reference is next had to FIGURE 4 for another slide-valve embodiment wherein a transducer 44 communicates or not with the pump 5 according to the position of the governing valve 24 of the slide-valve slide 45. This slide comprises, movable within a bore 46, two cylindrical bearing surfaces 47 and 48 separated by a groove 49 adapted to place the conduit 11 connected to transducer 44 in communication either with the conduit 12 connected to the pump 5, or with the discharge conduit 6. The slide-valve additionally comprises a bore 50 through which is movable a third cylindrical bearing surface 51 of said slide, which surface has a smaller diameter than the other surfaces and is separated from bearing surface 48 by a groove 52 which, regardless of the slide position in the slide valve casting, leaves in the latter an annular slide-controlling chamber $17^2$ permanently linked to the pump 5 through a conduit 54.

Through the interior of the slide, annular chamber $17^2$ communicates permanently with another slide-controlling chamber 18² formed at the end of the slide bearing surface 47 and surrounded by the groove 22 which places it in communication, under the control of bearing surface 47, with the discharge conduit 23 leading to the valve 24.

Communication between chambers 17² and 18² is effected through the slide via a blind axial conduit 55 having port in the chamber 18² and communicating through a fine diametrical passage 56 with chamber 17².

This system operates in similar manner to those described precedingly in the essential respect of the governing of slide 45 by valve 24, since the pressure or pressures prevailing in chambers 17² and 18² always exert opposing forces on the slide, and the fine diametrical passage 56 is the counterpart of the constricted passageway 21. In other words, one of the stable positions of slide-valve 45 corresponding to opening of valve 24 is that shown in the upper half-view of the slide-valve, wherein the opposing forces exerted on the slide by the different pressures prevailing in the chambers 17² and 18² balance each other (the slide partly uncovering the groove 22).

The other stable position of slide 45, corresponding to closure of valve 24, is that shown in the lower half-view of the slide-valve, wherein, due to the pressure becoming the same in chambers 17² and 18², its differential influence is exerted in the sense which causes the end bearing surface 51 of the slide to butt against a stop 57.

These two positions correspond to the transducer 44 being supplied and being placed in the discharging condition, respectively, and it is to be noted that the conduits 6 and 12 may be transposed if desired, whereby to permit actuating the transducer 44 responsively either to the open or closed condition of the valve 24.

Figures 5, 6:
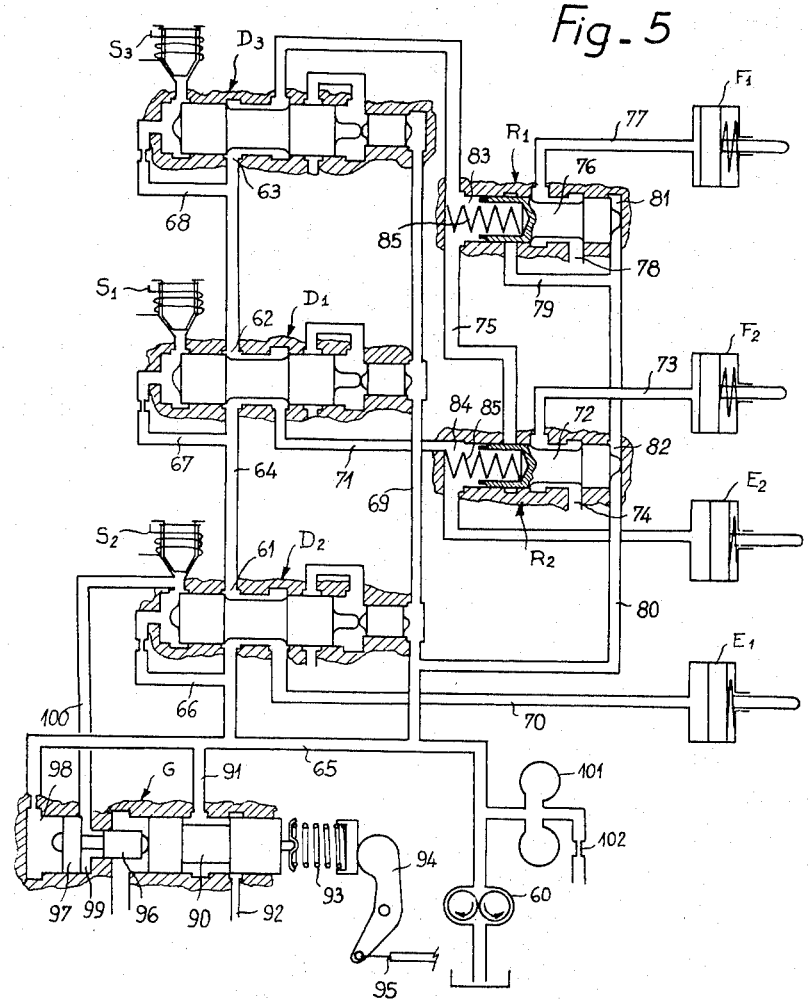
FIGURE 5 is a schematic overall view of a form of application of a plurality of electrohydraulic units according to the invention for controlling gear changes in a gearbox.
FIGURE 6 indicates, in box form, possible gear ratios with the apparatus.

Reference is next had to FIGURE 5 for an application wherein a plurality of identical electrohydraulic units are used jointly for operating a gearbox comprising four hydraulic transducers E1–E2–F1–F2, said gearbox (not shown) being assumed to be of the epicyclic type in which said transducers are associated to clutches or brakes which, since they are generally four in number, permit of customarily obtaining, in addition to a neutral position, three forward gear ratios and one reverse gear ratio. These ratios are here assumed to be obtained according to the indications of the table in FIGURE 6, in which the first line beneath the different possible combinations shown identifies the actuated transducers by their reference numeral, and the second line the correspondingly energized solenoid S1, S2 or S3 associated respectively to the three electrohydraulic units controlling said transducers, the corresponding slide-valves of which are designated D1, D2 and D3. These slide-valves are similar to those of FIGURE 3 and are supplied with pressure fluid by a pump 60.

The feed grooves 61, 62, 63 of the central slide-valve distribution chambers are connected to a common conduit 64 which is in turn connected to a conduit 65 leading to the pump.

The control chambers of the slide-valves, the discharge from which is controlled by said solenoids, are supplied through by-passes 66, 67 and 68 tapped off the conduit 64 and comprising a constricted passageway equivalent to the passageway 21 used in the foregoing embodiments.

The opposed control chambers of the slide-valves are fed through a common conduit 69 connected to conduit 65.

The slide-valve D2 is connected to the transducer E1 through a conduit 70. The distributor D1 is connected to the transducer E2 through a conduit 71 passing through a distributor relay R2. This relay comprises a cylindrical slide 72 having a central groove adapted to place the conduit 73 connected to transducer F2 in communication either with a discharge conduit 74 or with a feed conduit 75 leading from the slide-valve D3 and passing through a distributor relay R1. This relay R1 comprises a cylindrical slide 76 having a central groove adapted to place the conduit 77 connected to transducer F1 in communication either with a discharge conduit 78 or with a feed conduit 79. The latter is a by-pass tapped off a conduit 80 permanently connected to the delivery end of the pump and supplying also the slide control chambers 81 and 82 of relays R1 and R2, which chambers are formed at the ends of these slides, facing the control chambers 83 and 84 respectively (which are fed by the slide valves D3 and D1), and each of which contains a compression spring 85. The strength of these springs 85 is just sufficient to position the slides as shown in the drawing when the pump delivery pressure is applied to both sides of the slide. When, on the contrary, the pump pressure is applied only in chambers 81 and 82, the springs 85 are compressed and the slides 72, 76 thrust leftwardly of the drawing into their second distribution position, in which it will be noted that they leave free the conduit 71 connecting D1 to E2 and the conduit 75 connecting D3 to R2.

Since the capacity of the clutches varies with the pressure delivered by the pump, a regulating unit G is provided for continuously adjusting the clutch capacity concerned to the variable engine power controlled by the driver.

The regulating unit G is additionally subjected to twofold operating conditions according to the pressure that may be desirable for actuating one or more specific transducers as a function of the relative force they must develop. A case in point is provided in the example chosen here by the reverse gear combination, wherefor energization of the solenoid S2 is utilized, as will be seen hereinafter, for modifying operation of the regulating unit G.

This unit comprises a cylindrical slide 90 having a central groove adapted to place a conduit 91 tapped off conduit 65 in communication with a discharge conduit 92. One of the ends of the slide 90 sustains the pressure of a compression spring 93 whose counterthrust element is influenced in any convenient manner by the movement of the accelerator pedal (not shown), and in this particular instance through a lever 94 and a cable control 95. This control system is so devised that the higher the power called for by the accelerator pedal, the greater the degree to which the spring 93 is compressed.

The other end of slide 90 is movable responsively to a pushrod 96 sliding through the main casting of the unit and connected to a piston 97 movable within a cylinder whose chamber 98 remote from said pushrod is connected to conduit 65. The chamber 99 of said cylinder is connected through a conduit 100 to the discharge conduit of the control chamber of slide-valve D2, controlled by the valve actuated by solenoid S2.

The foregoing shows that in the event of the absence of any pressure in chamber 99, i.e. when solenoid S2 leaves the corresponding valve freely open, the delivery pressure of pump 60 will establish itself at a value whereby its effect in the chamber 98 on piston 97 is to balance the compressive force of spring 93 while the slide 90 just uncovers the discharge conduit 92 of the regulating unit.

Thus the delivery pressure depends upon the state of compression of spring 93, i.e. upon the power called for by the accelerator pedal.

Furthermore, when solenoid S2 is energized and the corresponding valve closed, the delivery pressure is then caused to prevail in chamber 99 where its differential effect on piston 97 and pushrod 96 partly counters its effect in chamber 98, so that for a given load on spring 93 the delivery pressure will be established at a value greater than that prevailing when solenoid S2 is not energized.

As FIGURE 5 schematically illustrates, provision may be made for using the pump 60 to supply a hydraulic converter 101 with is adapted in the customary manner to effect an engine gearbox coupling and the discharge conduit of which accordingly embodies a constriction 102.

The table in FIGURE 6 permits of readily appreciating the manner of operation of such a gearbox control mechanism, while FIGURE 5 shows this mechanism in the condition wherein third gear is engaged (no solenoids energized, and transducers E1 and E2 supplied).

It is to be noted that in the neutral condition N of the transmission system, the three solenoids S1–S2–S3 are energized, whereby in this condition (in which the engine is ordinarily idling and the output of pump 60 is consequently low) closure of the corresponding valves nonetheless allows of disposing of an adequate delivery pressure in the control circuit.

Such an arrangement is applicable to any gearbox, irrespective of the form of transducer feeding desired, since the electrohydraulic units are so devised that it is invariably possible to ensure the required fluid distributions in the neutral condition of the transmission, by resorting to closure of all the governing valves for this specific case.

It is also to be noted that the function of the relays R1 and R2 is to hydraulically coordinate the gear changes, for when a change is made from bottom to second gear, maintaining the energization of solenoid S2 maintains F2 in communication with conduit 75 through the medium of relay R2, while de-energization of solenoid S3 causes this conduit and hence the transducer F2 to be set under pressure. Due to the presence of relay R1, it is only after the transducer F2 has actually been actuated that the transducer F1 ceases to be actuated and is set in the discharging condition responsively to the urge of spring 85 exerted on the slide 76 when the pressure is established in conduit 75. The relay R1 may be said to effect a hydraulic synchonization, as it were, of the change from bottom to second gear.

In this case the relay R2 fulfils an identical function when changing from second to third gear, for in this case de-energization of solenoid S1 causes the conduit 71 and hence the transducer E2 to be set under pressure. Due to the existence of relay R2, the slide of which was previously in the extreme leftward position on the drawing (transducer F2 supplied), it is only after the transducer E2 has been effectively actuated that the transducer F2 ceases to be actuated and is placed in the discharging condition in response to the urge exerted by spring 85 on the slide 72 when the pressure is established in conduit 71 and transducer E2. It will, of course, readily be appreciated that these relays R1 and R2 perform identical functions when downward gear changes are made.

It is, of course, to be understood that many changes and modifications of parts may be made in the specific embodiments hereinbefore described with reference to the accompanying non-limitative exemplary drawings, without departing from the spirit and scope of the invention.

What is claimed is:

1. An electrohydraulic unit for controlling hydraulic transducers, comprising, a two-position slide-valve connectable to a pressure-fluid source, in which one of said positions causes said source to be connected to at least one transducer and the other causes said transducer to be discharged, a solenoid being provided to control the slide-valve position, characterized in that said solenoid controls a slide-valve governing valve and in that said slide-valve comprises, for the governing thereof, a casing with two chambers for controlling said slide-valve that are permanently connected to said source and so devised that said pressure-fluid exert opposing forces therein on said slide-valve, the latter having a larger effective control surface area in one of said chambers, which chamber is supplied through a constricted passage and connected through a passage controlled by said slide-valve to a discharge pipe which is closed or opened by said valve and on the closure or opening of which the two said slide-valve positions are dependent, that is to say that when said valve is open one of the slide-valve positions is that wherein said controlled passage is partly uncovered by the slide-valve as the result of a balancing of the opposing forces exerted thereon with different pressures, whereas when, on the contrary, said valve is closed, the slide-valve is located in its other position as a result of the preponderant influence of the controlling pressure in the chamber in which the effective slide-valve area is greater.

2. An electrohydraulic unit according to claim 1, wherein a movable slide of said slide valve comprises two bearing surfaces separated by a distribution groove, and at one end of one of said surfaces as chamber forming the first of said control chambers and associated with said larger effective slide area, and at the end of the other surface a bearing surface of smaller section which extends said other surface whereby to form within the slide-valve casting an annular chamber forming the second of said control chambers, said annular chamber being adapted to be permanently linked to said pressure source and communicating in addition through the body of said slide with said first chamber, said constricted passage being formed in this communicating passageway through the slide body.

3. An electrohydraulic unit for controlling hydraulic transducers according to claim 1, in particular for effecting gear ratio changes with selective control over at least two transducers, comprising, associated with said slide valve connected to one of said transducers, a relay comprising a distribution slide for causing the other of said transducers to be either supplied or set in the discharging condition and, postitioned on either side of the latter-mentioned slide, two control chambers of which one continuously sustains the pressure of said source and the other is connected to said slide valve and to the corresponding transducer, the latter-mentioned chamber comprising a spring whereby to cause said relay slide to move from one to the other of its distribution positions when, responsively to said slide valve, the pressure in said latter-mentioned chamber and in the transducer to which the same is connected prevails or vanishes.

No references cited.

EDGAR W. GEOGHEGAN, *Primary Examiner.*